(12) United States Patent
Nashimoto et al.

(10) Patent No.: US 7,685,361 B2
(45) Date of Patent: Mar. 23, 2010

(54) VIRTUALIZATION METHOD AND STORAGE APPARATUS FOR A STORAGE SYSTEM HAVING EXTERNAL CONNECTIVITY

(75) Inventors: Kunihiko Nashimoto, Odawara (JP); Noboru Furuumi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 161 days.

(21) Appl. No.: 11/400,272

(22) Filed: Apr. 10, 2006

(65) Prior Publication Data

US 2007/0198800 A1 Aug. 23, 2007

(30) Foreign Application Priority Data

Feb. 17, 2006 (JP) ............... 2006-040255

(51) Int. Cl.
*G06F 12/00* (2006.01)
(52) U.S. Cl. .............. 711/114; 711/156; 711/170; 711/173; 711/E12.016
(58) Field of Classification Search .............. None
See application file for complete search history.

(56) References Cited

U.S. PATENT DOCUMENTS

| | | | |
|---|---|---|---|
| 6,311,193 B1 * | 10/2001 | Sekido | ............ 707/202 |
| 6,684,209 B1 * | 1/2004 | Ito et al. | ............ 707/9 |
| 2005/0071559 A1 | 3/2005 | Tamura et al. | |
| 2005/0120172 A1 | 6/2005 | Ozaki et al. | |

FOREIGN PATENT DOCUMENTS

| | | |
|---|---|---|
| EP | 1 117 028 A2 | 5/2000 |
| EP | 1 548 563 A1 | 4/2004 |
| JP | 2005-157867 | 11/2003 |

OTHER PUBLICATIONS

Extended European Search Report, Dated Jul. 7, 2009.
"dpANS SCSI Primary Commands—3 (SPC-3)—Project T10/1416-D—Revision 23—Par. 6.4 Inquiry command", Internet Citation, May 4, 2005 (Online), XP002425739.

* cited by examiner

*Primary Examiner*—Reginald G Bragdon
*Assistant Examiner*—Shawn X Gu
(74) *Attorney, Agent, or Firm*—Foley & Lardner LLP

(57) ABSTRACT

A virtualization method for a storage system recognizes one or more logical devices located in a first and second storage apparatus and defined in a host apparatus as being connected to a channel, based on an inquiry command sent from the host apparatus when the channel comes on-line; detects one or more logical devices among the one or more logical devices defined in the host apparatus as being connected to the channel and located in the first and second storage apparatus, based on the recognition result; sets, based on the detection result, one or more virtual volumes in the first storage apparatus, respectively corresponding to the one or more logical devices in the second storage apparatus; and sets a first logical path between each of the set one or more virtual volumes and each of the corresponding one or more logical devices in the second storage apparatus.

14 Claims, 18 Drawing Sheets

FIG.6

| Device Characteristics Information | |
|---|---|
| Byte | Description |
| 0-1 | Storage director type | ~40A
| 2 | Storage director model information | ~40B
| 3-4 | Device type | ~40C
| 5 | Device model | ~40D
| . | . |
| . | . |
| . | . |
| . | . |

| ITEM | VALUE |
|---|---|
| INTERNAL APPARATUS PORT ID | 1A |
| EXTERNAL APPARATUS PORT ID | 1B |
| INTERNAL APPARATUS MANUFACTURE NUMBER | 12345 |

| ITEM | CU:LDEV |
|---|---|
| CU:LDEVs SET FOR RELEVANT CHANNEL ID, RECOGNIZED BY INTERNAL STORAGE APPARATUS | 00:00<br>00:01<br>00:02<br>00:03<br>00:0F |

FIG.12

| ITEM | CU:LDEV | JUDGMENT | REMARKS |
|---|---|---|---|
| CU:LDEVs TO WHICH COMMAND HAS BEEN ISSUED | 00:00<br>00:01<br>00:02<br>00:03<br>00:0F | CU:LDEVs SET FOR RELEVANT CHANNEL ID, RECOGNIZED BY INTERNAL STORAGE APPARATUS | - |
| RESPONSIVE CU:LDEVs | 00:00<br>00:01<br>00:02<br>00:03 | JUDGED AS DEVICE INCLUDED IN CONFIGURATION IN EXTERNAL STORAGE APPARATUS | RECOGNIZE DEVICE TYPE BASED ON RESPONSE |
| NON-RESPONSIVE CU:LDEVs | 00:0F | JUDGED AS DEVICE NOT INCLUDED IN CONFIGURATION IN EXTERNAL STORAGE APPARATUS | - |

FIG.13

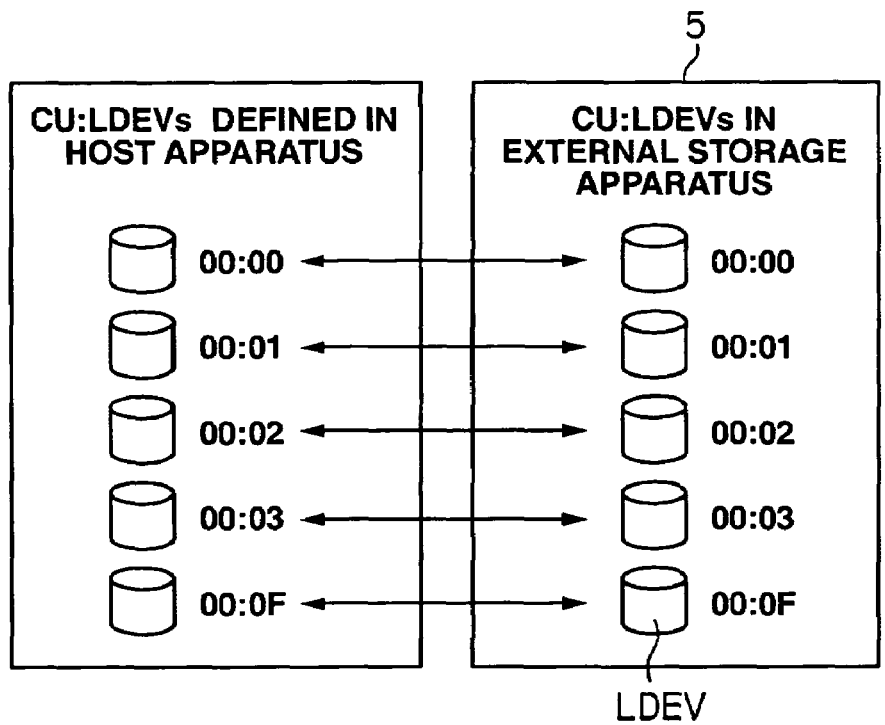

| ITEMS | CU:LDEV | REMARKS |
|---|---|---|
| CU:LDEVs SET FOR RELEVANT CHANNEL ID, RECOGNIZED BY INTERNAL STORAGE APPARATUS | 00:00<br>00:01<br>00:02<br>00:03<br>00:0F | CU:LDEVs CORRESPOND TO EACH OTHER |
| CU:LDEVs INCLUDED IN CONFIGURATION IN EXTERNAL STORAGE APPARATUS | 00:00<br>00:01<br>00:02<br>00:03<br>00:0F | |

FIG.16

| CU:LDEV | PROCESSING |
|---|---|
| ANY OF DEVICES 00:00 TO 00:03 AND 00:0F INCLUDED IN INTERNAL STORAGE APPARATUS<br><br>4 — CU:LDEVs IN INTERNAL STORAGE APPARATUS<br>— LDEV(VVOL) 00:00, 00:01, 00:02, 00:03, 00:0F (VVOL)<br><br>5 — CU:LDEVs IN EXTERNAL STORAGE APPARATUS<br>00:00, 00:01, 00:02, 00:03, 00:0F (LDEV) | DISPLAY ON USER I/F INFORMATION THAT CU:LDEVs WITH SAME CUN:LDEVNs AS THOSE FOR VIRTUALIZATION OBJECT CU:LDEVs ALREADY EXIST IN INTERNAL STORAGE APPARATUS |

| ITEM | CU:LDEV | REMARKS |
|---|---|---|
| CU:LDEVs SET FOR RELEVANT CHANNEL ID, RECOGNIZED BY INTERNAL STORAGE APPARATUS | 00:00<br>00:01<br>00:02<br>00:03<br>00:0F | CU:LDEVs DO NOT CORRESPOND TO EACH OTHER |
| CU:LDEVs INCLUDED IN CONFIGURATION IN EXTERNAL STORAGE APPARATUS | 00:00<br>00:01<br>00:02<br>00:03 | |

FIG.21A

| ID | CUN | LDEVN |
|---|---|---|
| 00 | 00 | 00 |
|  |  | 01 |
|  |  | 02 |
| 01 | 00 | 00 |
|  |  | 01 |
|  |  | 02 |

FIG.21B

| ID | CUN | LDEVN | Port |
|---|---|---|---|
| 00 | 00 | 00 | 00 |
|  |  | 01 |  |
|  |  | 02 |  |
| 01 | 00 | 00 | 01 |
|  |  | 01 |  |
|  |  | 02 |  |

FIG.21C

INTERNAL STORAGE APPARATUS

| ID | CUN | LDEVN | Port |
|---|---|---|---|
| 01 | 00 | 00 | 01 |
|  |  | 01 |  |
|  |  | 02 |  |

⇧ MAPPING PERFORMED BETWEEN CU:LDEVs WITH SAME CUN:LDEVN

EXTERNAL STORAGE APPARATUS

| CUN | LDEVN |
|---|---|
| 00 | 00 |
|  | 01 |
|  | 02 |

VIRTUALIZATION METHOD AND STORAGE APPARATUS FOR A STORAGE SYSTEM HAVING EXTERNAL CONNECTIVITY

CROSS-REFERENCES TO RELATED APPLICATIONS

This application relates to and claims priority from Japanese Patent Application No. 2006-040255, filed on Feb. 17, 2006, the entire disclosure of which is incorporated herein by reference.

BACKGROUND

1. Field of the Invention

The present invention relates to a storage system, a virtualization method, and a storage apparatus, and is particularly suitable for a storage apparatus having external connectability, and a storage system having the storage apparatus as a component.

2. Description of Related Art

As disclosed in JP-A-2005-157867, a conventional storage apparatus has, as one of its functional capabilities, external connectability that can virtualize logical volumes (logical volumes are units of storage areas, and they are conventionally referred to as "logical devices" in mainframe systems) provided by each of one or more other storage apparatuses connected to that storage apparatus.

In these cases, in a storage apparatus (hereinafter, referred to as "internal storage apparatus") that virtualizes another storage apparatus, virtual logical volumes (hereinafter, referred to as "virtual volumes") are configured in association with logical volumes defined in the virtualized storage apparatus (hereinafter, referred to as "external storage apparatus").

The internal storage apparatus, upon receipt of a request from a host apparatus to access a virtual volume, transfers the access request to the external storage apparatus that has the corresponding logical volume, and has the external storage apparatus execute the actual data input/output processing.

The aforementioned external connectability makes it possible to collectively manage the logical volumes provided by a plurality of storage apparatuses, facilitating easy addition of a storage apparatus or similar.

SUMMARY

With the external connectability described above, in order to access an external storage apparatus from a mainframe host apparatus, it is necessary to configure a virtual volume with a device number corresponding to generation information held by the host apparatus in the internal storage apparatus, and also configure a logical path between the virtual volume and the corresponding logical device in the external storage apparatus. Here, generation information means information that specifies a control unit (in this specification, a control unit refers to a storage apparatus) connected to the channels connected to a host apparatus, or a device, such as a logical device, existing in the control unit, and the information is defined by a system administrator in the host apparatus.

When logical paths are configured between virtual volumes in an internal storage apparatus and the corresponding logical devices in an external storage apparatus, a user first searches for device information on the devices connected to the channels set between the internal storage apparatus and a host apparatus, which is contained in the generation information held by the host apparatus. More specifically, the user searches for an identification number for an external storage apparatus, which is a control unit, or an identification number for a logical device configured in the external storage apparatus (hereinafter, collectively referred to as device numbers").

Subsequently, the user assigns virtual volumes, each configured in association with a logical device in the external storage apparatus, with the device numbers for their corresponding logical devices so that the external storage apparatus device configuration recognized by the host apparatus based on the generation information, and the virtual device configuration in the internal storage apparatus perfectly correspond to each other. Then, a logical path, which is a logical communication channel, is formed between each of the virtual volumes in the internal storage apparatus, and a corresponding logical device in the external storage apparatus.

In this case, in a conventional storage apparatus having the aforementioned external connectability, it is necessary to manually set corresponding device numbers for the virtual volumes in the internal storage apparatus, or configure logical paths between these virtual volumes and the corresponding logical devices in the external storage apparatus; which is problematic in that a large workload will be imposed on the system administrator to perform the pre-settings for external connection.

Also, in a conventional storage apparatus having the aforementioned external connectability, when there is an error in setting the correspondence between the virtual volumes in an internal storage apparatus and the logical devices in an external storage apparatus, for example, one where data that should be stored in a first logical device is stored in a second logical device, not the first logical device, this causes a problem in that data originally stored in the second logical device may be destroyed by the writing of that data.

The present invention has been made in consideration of the above points, and an object of the present invention is to provide a highly-reliable storage system, virtualization method, and storage apparatus that are less burdensome settings-wise, capable of: first, omitting pre-settings for external connection; and second, preventing the occurrence of data destruction caused by errors in logical path settings.

In order to achieve the above object, the present invention provides a storage system provided with an internal apparatus between a host apparatus and an external apparatus that provides one or more logical devices for storing data, the one or more logical devices provided by the external apparatus being virtualized by the internal apparatus, the storage system including: upon a channel connected to the internal apparatus coming on-line, the host apparatus sending a predetermined inquiry command to all logical devices defined as being connected the channel via the channel; and the internal apparatus: recognizing the logical devices defined in the host apparatus as being connected to the channel, based on the inquiry command sent from the host apparatus, detecting one or more logical devices, from among the logical devices defined in the host apparatus as being connected to the channel, that exist in the external apparatus, based on the recognition result, and setting, based on the detection result, one or more virtual volumes in its own apparatus, respectively corresponding to the one or more logical devices, from among the one or more logical volumes defined in the host apparatus as being connected to the channel, that exist in the external apparatus, and also sets a first logical path between each of the set one or more virtual volumes and each of the corresponding one or more logical devices existing in the external apparatus.

In a storage system with the above configuration, the setting of a virtual volume in an internal apparatus, and the setting of a logical path between the virtual volume and its corresponding logical device in an external apparatus are performed without human labor, making it possible to omit system administrator workload for these settings, and also to prevent the occurrence of data destruction caused by any error in the settings.

The preset invention also provides a logical device virtualization method for a storage system provided with an internal apparatus between a host apparatus and an external apparatus that provides one or more logical devices for storing data, the one or more logical devices provided by the external apparatus being virtualized by the internal apparatus, the method including: a first step of, when a channel connected to the internal apparatus comes on-line, the host apparatus sending a predetermined inquiry command to all logical devices defined as being connected to the channel via the channel; a second step of the internal apparatus recognizing the logical devices defined in the host apparatus as being connected to the channel, based on the inquiry command sent from the host apparatus; a third step of the internal apparatus detecting one or more logical devices, from among the logical devices defined in the host apparatus as being connected to the channel, that exist in the external apparatus, based on the recognition result; and a fourth step of the internal apparatus setting, based on the detection result, one or more virtual volumes in its own apparatus, respectively corresponding to the one or more logical devices, from among the logical devices defined in the host apparatus as being connected to the channel, that exist in the external apparatus, and also setting a first logical path between each of the set one or more virtual volumes and each of the corresponding one or more logical devices existing in the external apparatus.

According to the above virtualization method, the setting of a virtual volume in an internal apparatus, and the setting of a logical path between the virtual volume and its corresponding logical device in an external apparatus are performed without human labor, making it possible to omit system administrator workload for these settings, and also to prevent the occurrence of data destruction caused by any error in the settings.

The present invention further provides a storage apparatus provided between a host apparatus and an external storage apparatus that provides one or more logical devices for storing data, the storage apparatus virtualizing the one or more logical devices provided by the external apparatus, the storage apparatus including: a logical device recognition unit that, when the host apparatus sends a predetermined inquiry command to all logical devices defined as being connected to a channel connected to the storage apparatus via the channel upon the channel coming on-line, recognizes the one or more logical devices defined in the host apparatus as being connected to the channel, based on the inquiry command sent from the host apparatus; a device detection unit that detects one or more logical devices, from among the one or more logical devices defined in the host apparatus as being connected to the channel, that exist in the external apparatus, based on the recognition result; and a logical path setting unit that sets, based on the detection result, one or more virtual volumes in its own apparatus, respectively corresponding to the one or more logical devices defined in the host apparatus as being connected to the channel, that exist in the external apparatus, and also sets a first logical path between each of the set one or more virtual volumes and each of the corresponding one or more logical devices existing in the external apparatus.

In a storage apparatus with the above configuration, the setting of a virtual volume in an internal apparatus, and the setting of a logical path between the virtual volume and its corresponding logical device in an external apparatus are performed without human labor, making it possible to omit system administrator workload for these settings, and also to prevent the occurrence of data destruction caused by any error in the settings.

The present invention makes it possible to provide a highly-reliable storage system, virtualization method, and storage apparatus that are less burdensome settings-wise.

BRIEF DESCRIPTION OF THE DRAWINGS

FIG. 6 is a conceptual diagram provided to explain a "Device Characteristic Information" command.

FIG. 12 is a conceptual diagram provided to explain path setting processing.

FIG. 13 is a conceptual diagram provided to explain path setting processing.

FIG. 16 is a conceptual diagram provided to explain path setting processing.

FIG. 21A, FIG. 21B and FIG. 21C are conceptual diagrams provided to explain error processing during path setting processing according to a second embodiment.

DETAILED DESCRIPTION OF THE PREFERRED EMBODIMENTS

An embodiment of the present invention is described below with reference to the drawings.

Figure 1:
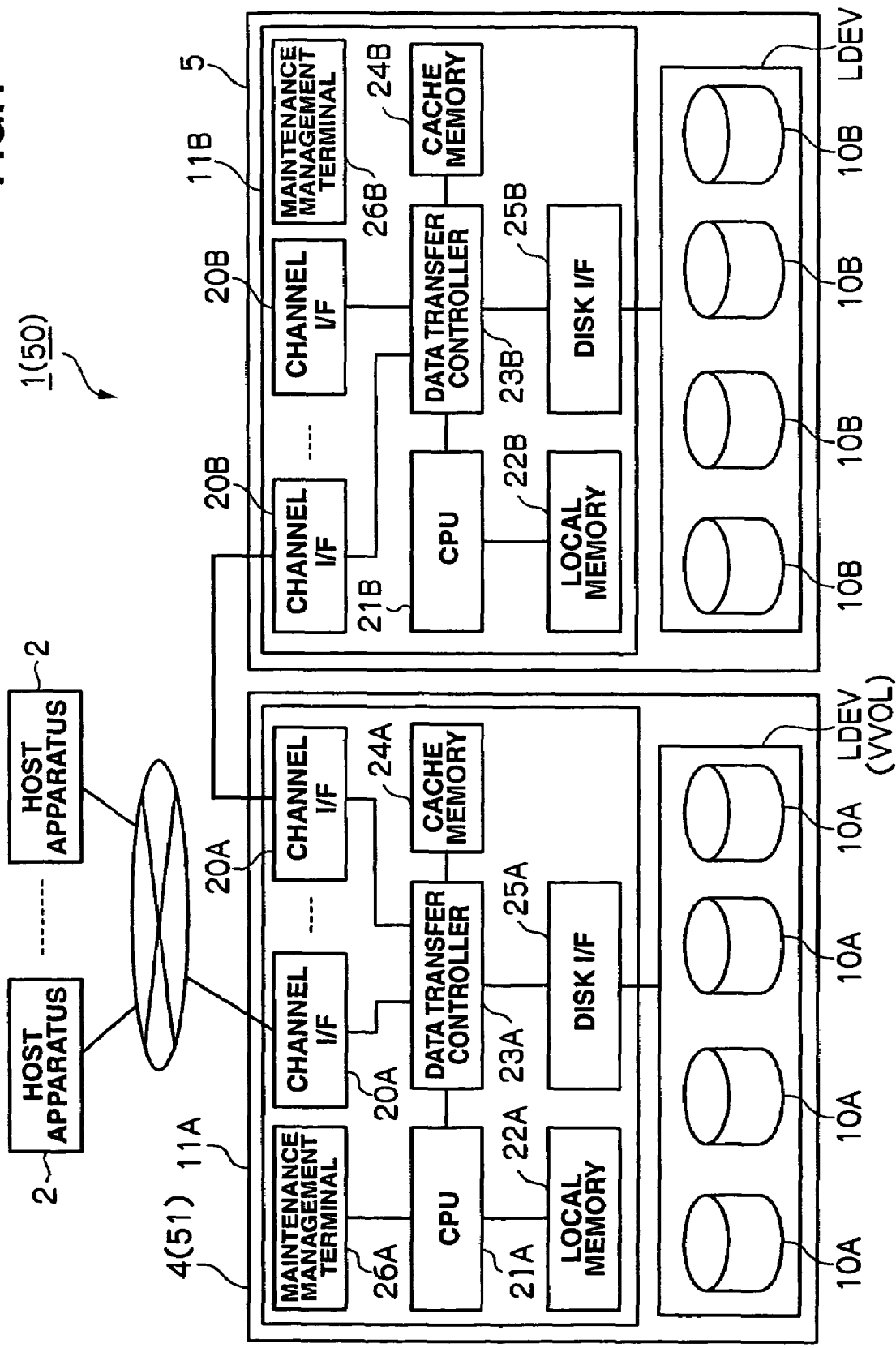
FIG. 1 is a block diagram illustrating the configuration of a storage system according to an embodiment of the present invention.

(1) Configuration of a Storage System According to an Embodiment of the Present Invention In FIG. 1, reference numeral 1 indicates an entire storage system according to the embodiment. The storage system is configured by host apparatuses 2 being connected to an internal storage apparatus 4 via a network 3, and the internal apparatus 4 being connected to an external storage apparatus 5.

A host apparatus 2 is a mainframe computer apparatus having information processing resources, such as a CPU (central processing unit), and memory, etc. The host apparatus 2 executes the below-described processing by the CPU executing various control programs stored in the memory. The host apparatus 2 also has information input devices (not shown), such as a keyboard, a switch, a pointing device, a microphone, and information output device (not shown), such as a monitor display, and speaker.

The network 3 is configured of, for example, a SAN (Storage Area Network), a LAN (Logical Area Network), the Internet, and a public line or a dedicated line. Communication between the host apparatuses 2 and the internal apparatus 4 via the network 3 is performed according to Fibre Channel Protocol if the network 3 is a SAN, and according to TCP/IP (Transmission Control Protocol/Internet Protocol) if the network 3 is a LAN.

The internal storage apparatus 4 includes a plurality of disk devices 10A and a controller 11A that controls these disk devices 10A.

A disk device 10A may be an inexpensive disk drive such as an SCSI (Small Computer System Interface) disk, or an inexpensive disk such as a SATA (Serial AT Attachment) disk or optical disk. One or more disk devices 10A provide a storage area where one or more logical devices LDEV are defined. Data from a host apparatus 2 is stored in the logical devices LDEV.

The controller 11A includes a plurality of channel interfaces 20A, a CPU 21A, local memory 22A, a data transfer controller 23A, cache memory 24A, a disk interface 25A, and a maintenance management terminal 26A.

The channel interfaces 20A, each being an interface to the network 3, send/receive write data, data read from the disk devices 10A, and various commands to/from the host apparatuses 2. One of the plurality of channel interfaces 20A is connected as an external connection interface to the external storage apparatus 5 via a network such as a cable or a LAN, and sends/receives data and commands to/from the external storage apparatus 5.

The CPU 21A executes various processing including that relating to external connection, by executing a microprogram read from the disk devices 10A to the local memory 22A.

The local memory 22A is used as work memory for the CPU 21A. The data transfer controller 23A controls data transfer between the channel interfaces 21A and the disk interface 25A based on the control from the CPU 21A.

The cache memory 24A is used for temporarily storing data to be transferred between the channel interfaces 20A and the disk interface 25A. The cache memory 24A also stores system information read from system disks 10A when the internal storage apparatus 4 starts.

The disk interface 25A, which is an interface to the disk devices 10A, sends/receives write data, data read from the disk devices 10A, and various commands to/from the disk devices 10A according to, for example, Fibre Channel Protocol.

The maintenance management terminal 26A is a computer apparatus used for maintenance and management of the internal storage apparatus 4, and is, for example, a laptop personal computer. The maintenance management terminal 26A can monitor the internal storage apparatus 4 for any error occurring therein, and display the monitored status on a display screen (not shown), and can also order blocking of a disk device 10A based on an instruction from a host apparatus.

The external storage apparatus 5 has a similar configuration to the internal storage apparatus 4, as can be seen from FIG. 1, where the external storage apparatus 5's components are provided with the same reference numerals as those for the corresponding components in the internal storage apparatus 4—but with "A" instead of "B". One of the channel interfaces 20B in the external storage apparatus 5 is connected to the external connection channel interface 20A in the internal storage apparatus 4, and the external storage apparatus 5 communicates with the internal storage apparatus 4 via this channel interface 20B.

(2) Logical Path Setting Function

(2-1) Differences in Logical Path Settings Between an Open System and a Mainframe System Next, a logical path setting function included in the internal storage apparatus 4 in the storage system 1 according to the embodiment of the present invention is explained below.

First, the differences in the method for setting a logical path for external connection between the internal storage apparatus 4 and the external storage apparatus 5 when the storage system 1 is an open system (a computer system made from a combination of software and hardware from various manufacturers), and when the storage system 1 is a mainframe system (a general-purpose computer apparatus used in a corporate core system), will be explained.

Figure 2:
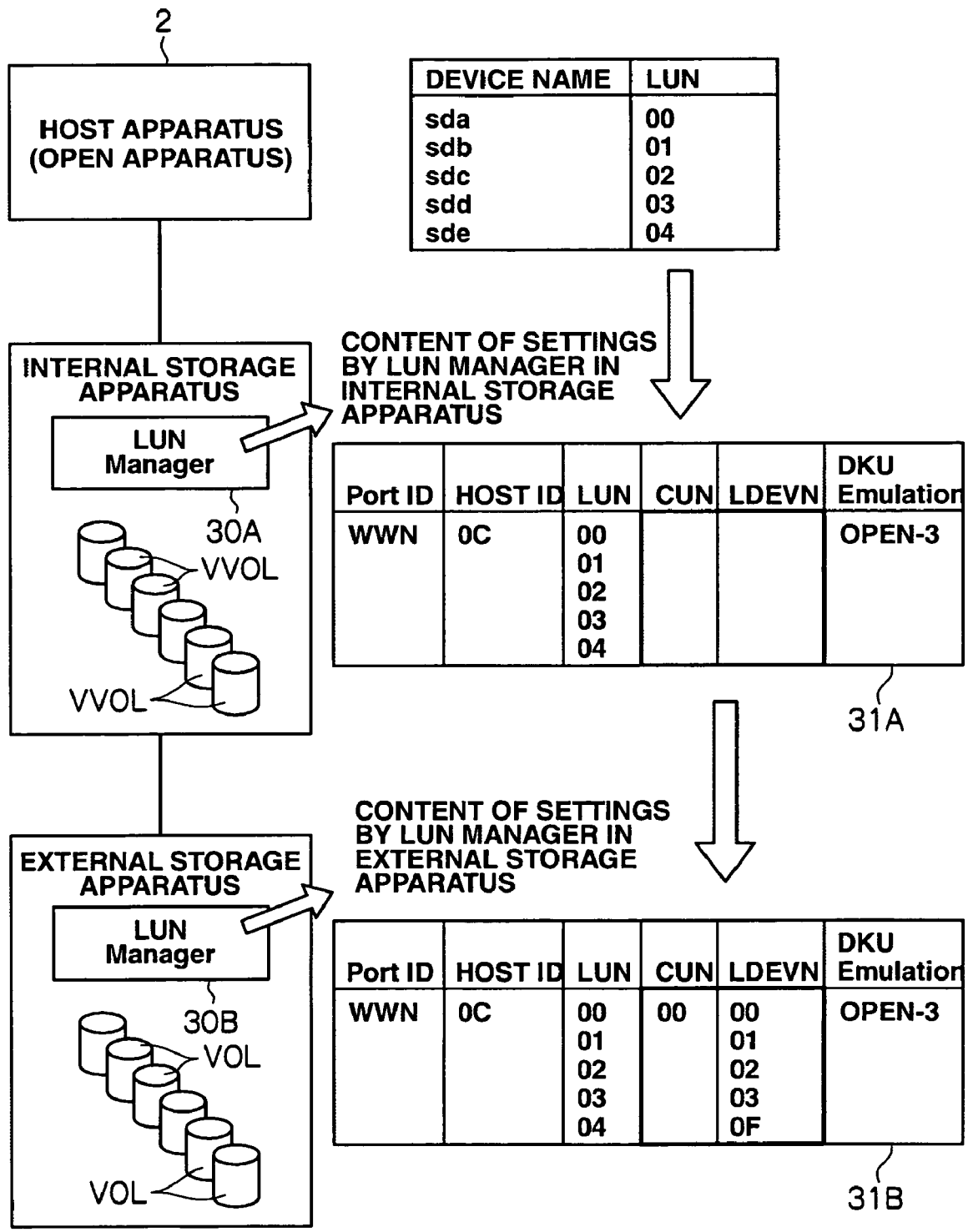
FIG. 2 is a conceptual diagram provided to explain the setting of a path between a host apparatus and an external storage apparatus when the host apparatus is an open apparatus.

When a host apparatus 2 is an open apparatus, as shown in FIG. 2, control programs 30A and 30B (hereinafter referred to as LUN managers) installed in the internal storage apparatus 4 and the external storage apparatus 5 respectively, set a logical path between the host apparatus 2 and the internal storage apparatus 4, and a logical path between the internal storage apparatus 4 and the external storage apparatus 5, respectively.

Specifically, as shown in FIG. 2, the LUN managers 30A and 30B in the internal storage apparatus 4 and the external storage apparatus 5 respectively create and store tables 31A and 31B (hereinafter referred to as the "logical unit management tables") in which a port ID ("Port ID") for each port, ID for a host apparatus 2 ("HOST ID") connected to the port, a LUN ("LUN"), which is an identification number for a virtual volume VVOL or logical volume VOL for which a logical path to the port is set, and the device type ("DKU Emulation") of the relevant storage apparatus are associated with each other.

Here, in association with the LUN for each of logical volumes VOL, the LUN manager 30B in the external storage apparatus 5 registers an identification number (CUN) for the control unit (the external storage apparatus 5) having the logical volume VOL, and an identification number ("LDEVN") for the logical volume VOL when it is treated as a logical device LDEV in the logical unit management table 31B, to manage that information.

Here, as with the LUN manager 30B in the external storage apparatus 5, the LUN manager 30A in the internal storage apparatus 4 also creates and stores the logical unit management table 31A in which a port ID ("Port ID") for each port, ID for a host apparatus 2 ("HOST ID") connected to the port, a LUN ("LUN"), which is an identification number for a virtual volume VVOL for which a logical path to the port is set, an identification number for a control unit having a logical volume VOL corresponding to the virtual volume VVOL ("CUN"; hereinafter referred to as the "control unit number"), an identification number for a logical volume VOL corresponding to each virtual volume when it is treated as a logical device LDEV, and the device type ("DKU Emulation") of the relevant storage apparatus are associated with each other.

However, in an open system, an LUN is used to designate a virtual volume VVOL or a logical volume VOL between the host apparatus 2, the internal storage apparatus 4, and the external storage apparatus 5, and therefore, the LUN manager 30A in the internal storage apparatus 4 can set unique numbers for a control unit number ("CUN") and a logical device number ("LDEVN") for each virtual volume VVOL in the logical unit management table 31A.

The host apparatus 2 searches for a virtual volume VVOL set by the LUN manager 30A in the internal storage apparatus 4, and assigns a device name to the detected virtual volume VVOL to access the same. In this case, if the host apparatus 2 is an open apparatus, it does not manage generation information relating to the logical volumes VOL connected to each channel. It also does not manage the logical volumes VOL connected to each channel, using control unit numbers and logical device numbers.

Figure 3:
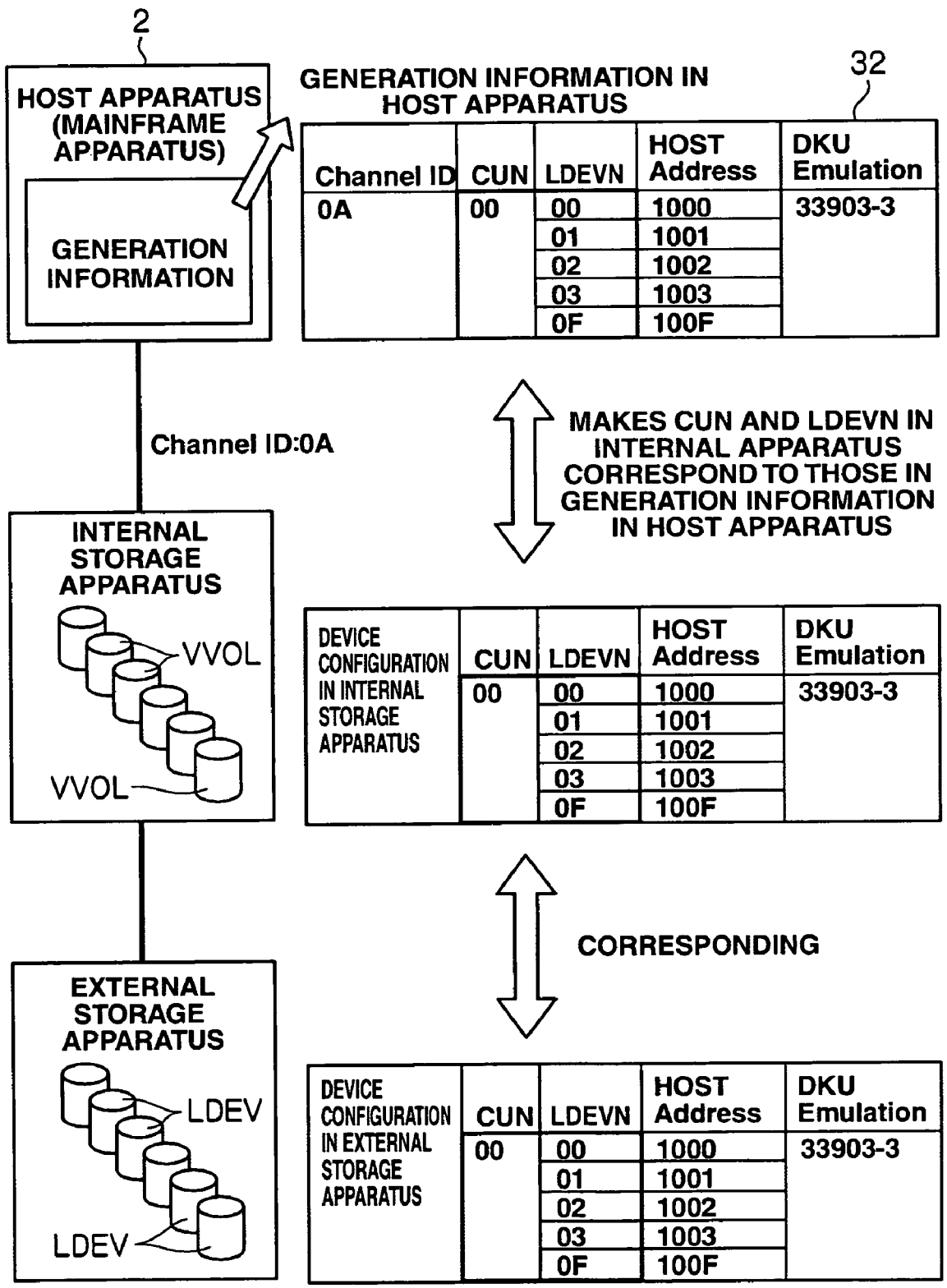
FIG. 3 is a conceptual diagram provided to explain the setting of a path between a host apparatus and an external storage apparatus when the host apparatus is a mainframe apparatus.

Meanwhile, if the host apparatus 2 is a mainframe apparatus, as shown in FIG. 3, a system administrator sets a logical path between a virtual volume VVOL in the internal storage apparatus 4 and a logical device LDEV in the external storage apparatus 5.

More specifically, the system administrator creates generation information 32 in which ID for each channel ("Channel ID"), a control unit number ("CUN") for the control unit (the external storage apparatus 5) connected to the channel, a logical device number ("LDEVN") for each logical device LDEV in the control unit, an identification number (HOST Address) recognized by the host apparatus 2 for each logical device LDEV, and the internal storage apparatus 4's device type ("DKU Emulation") are associated with each other, and makes the host apparatus 2 store that information.

For example, generation information 32 shown in FIG. 3 indicates that a channel with a channel ID "0A" is connected to a control unit with a control unit number "00" (external storage apparatus 5), that the control unit contains logical devices LDEV with logical device numbers "01," "02," "03," "04" and "0F," that these logical devices LDEV are managed by the host apparatus 2 with addresses "1000," "1001," "1002," "1003," and "100F," respectively, and that the device type for each of these logical devices LDEV is "33903-3."

The system administrator sets virtual volumes VVOL in the internal storage apparatus 4 in association with the logical devices LDEV in the external storage apparatus 5 that are defined in the generation information in the host apparatus 2, assigns these virtual volumes VVOL with device numbers for the corresponding logical devices LDEV (a device number is the combination of a control unit number and a logical device number), and also sets a logical path between each virtual volume VVOL and the corresponding logical device LDEV in the external storage apparatus 5.

In this case, in the mainframe system, a device number is used to designate a logical device LDEV between the host apparatus 2, the internal storage apparatus 4 and the external storage apparatus 5, and therefore, it is necessary for the device numbers for the logical devices LDEV defined in the generation information in the host apparatus 2, those assigned to the virtual volumes in the internal storage apparatus 4, and those for the logical devices in the external storage apparatus 5 to correspond perfectly to each other. It is also necessary that the virtual volumes VVOL in the internal storage apparatus 4 be respectively connected to the corresponding logical devices in the external storage apparatus 5 via the logical paths.

However, the setting of device numbers for the virtual volumes VVOL in the internal storage apparatus 4, and the setting of logical paths between the virtual volumes VVOL and the logical devices LDEV are performed by human labor, so there are problems in that workers will have large workloads, and that trouble, such as data destruction, may occur due to any setting errors.

Therefore, in the storage system 1 according to the embodiment of the present invention, the internal storage apparatus 4 recognizes device information contained in the generation information in the host apparatus 2, and based on the recognized device information, sets necessary virtual volumes VVOL and logical paths between these virtual volume VVOL and their corresponding logical devices in the external storage apparatus 5.

Next, the logical path setting function included in the internal storage apparatus 4 will be detailed.

(2-2) Logical Path Setting Processing

Figure 4:
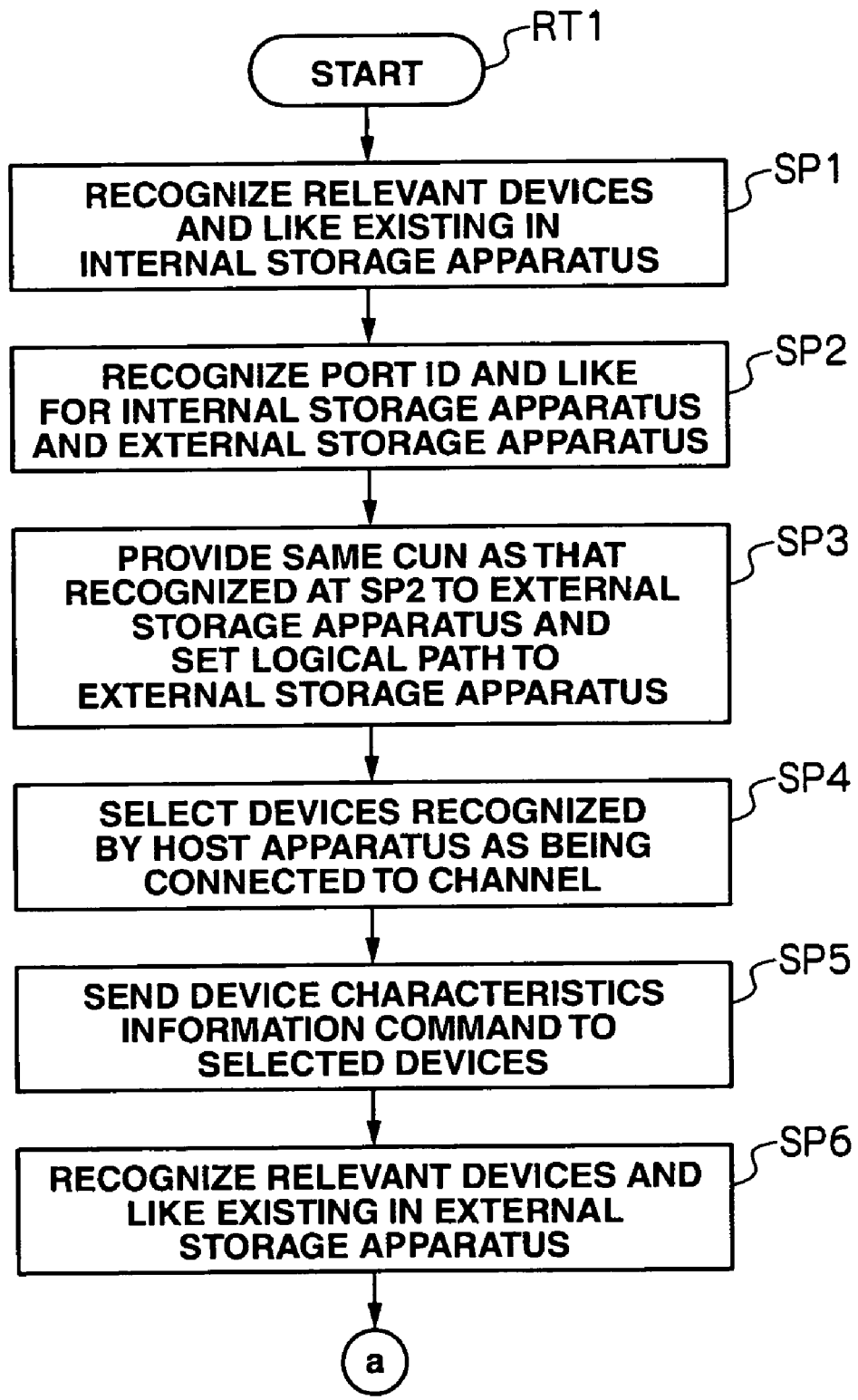
FIG. 4 is a flowchart showing a path setting procedure.
Figure 5:
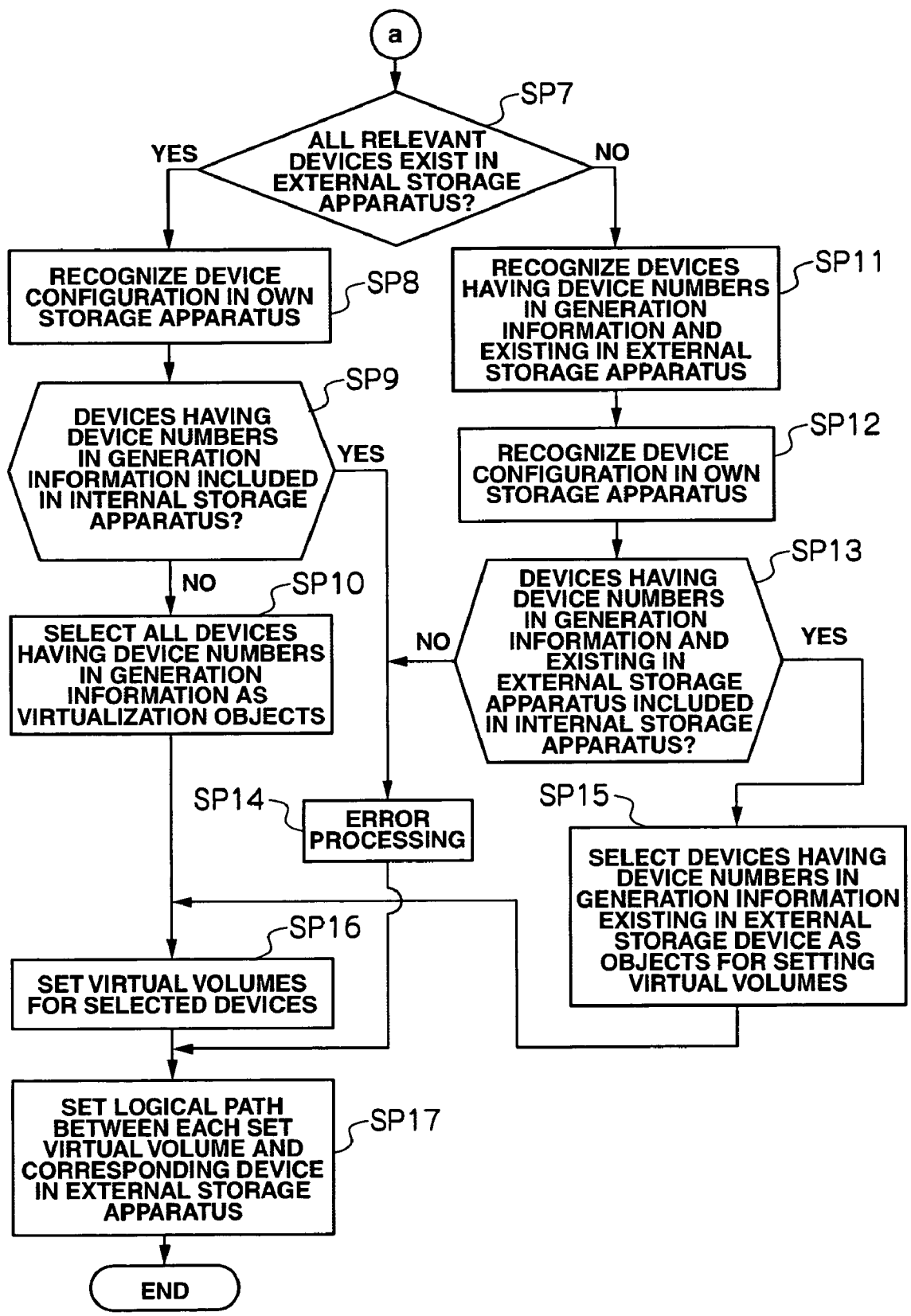
FIG. 5 is a flowchart showing a path setting procedure.

FIG. 4 and FIG. 5 each are flowcharts showing a sequence of processes performed by the CPU 21A in the internal storage apparatus 4 in relation to the logical path setting function. The CPU 21A in the internal storage apparatus 4, triggered by the host apparatus 2's execution of on-line processing for making a channel connected to its own storage apparatus come on-line, executes a path setting procedure RT1 shown in FIG. 4 and FIG. 5 based on the microprogram stored in the local memory 22A.

In other words, the host apparatus 2, upon a channel connected to the internal storage apparatus 4 (its channel ID is "0A") coming on-line, sends a "Device Characteristics Information" command to each of the logical devices connected to the channel with the channel ID "0A" based on the generation information 32 described above with reference to FIG. 3.

The "Device Characteristics Information" command is an inquiry command to seek information on the configuration of the destination device, and as shown in FIG. 6, has fields 40A, 40B, 40C, 40D, . . . for respectively storing different information such as control unit type information ("Storage director type") indicating the type of host apparatuses 2 that can access the logical device LDEV, control unit model information ("Storage director model information"), which is detailed information on the control unit type information, device type information ("Device type") indicating the logical device LDEV type, and device model information ("Device model"), which is information incidental to the device type information. Here, the "Device Characteristics Information" command is sent from the host apparatus 2 to each of the logical devices LDEV when no information corresponding to the fields 40A to 40D, . . . is stored.

Thus, if the destination for the "Device Characteristics Information" command, that is, a logical device LDEV recognized by the host apparatus 2 as being connected to the channel, exists in the internal storage apparatus 4, the logical device LDEV sends a response that contains relevant information stored in each of the fields 40A to 40D in the "Device Characteristics Information" command to the host apparatus 2.

Figure 7:
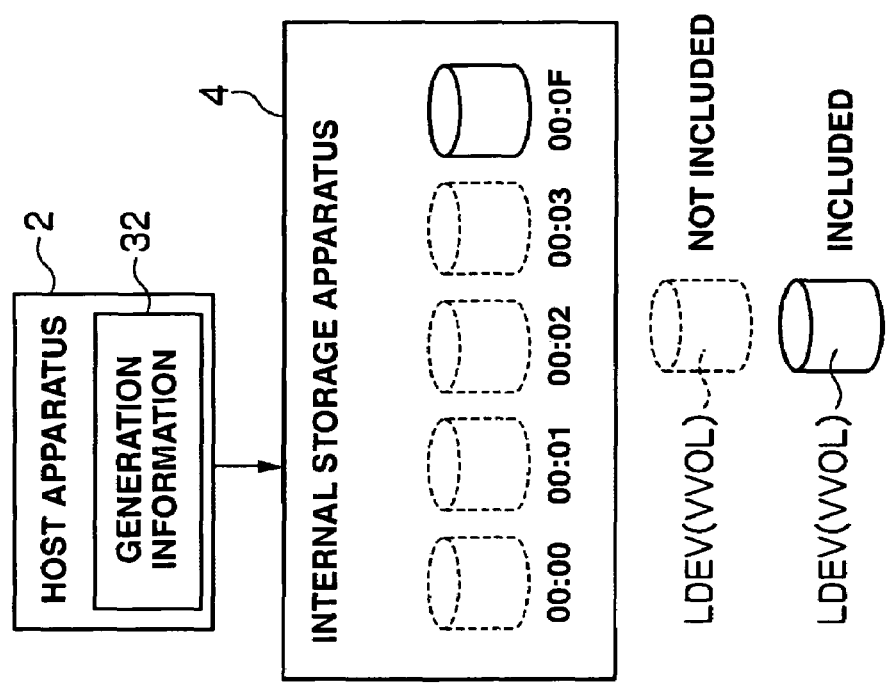
FIG. 7A and FIG. 7B are conceptual diagrams provided to explain path setting processing.

Consequently, the CPU 21A in the internal storage apparatus 4, based on the logical device LDEV's response to the "Device Characteristics Information" command, recognizes the device numbers for the devices recognized by the host apparatus 2 as being connected to the channel, that exists in the internal storage apparatus 4 (hereinafter, it is assumed that only the logical device LDEV with a device number "00:0F" in FIG. 7 applies) as shown in FIGS. 7A and 7B (SP1).

Meanwhile, when no destination for the "Device Characteristics Information" command, that is, no logical device LDEV recognized by the host apparatus 2 as being connected to the channel, exists in the internal storage apparatus 4, there is no response to that command.

Consequently, the CPU 21A in the internal storage apparatus 4 recognizes devices recognized by the host apparatus 2 as being connected to the channel, that do not exist in the internal storage apparatus 4 (hereinafter, it is assumed that the logical devices LDEV with the device numbers "00:00" to "00:03" in FIG. 7 apply) as show in FIG. 7 (SP1).

The CPU 21A recognizes the host apparatus 2 type at step SP1 based on the host apparatus 2's vendor name obtained when link-initialization processing is performed when connecting its own storage apparatus (the internal storage apparatus 4) and the host apparatus 2 (SP1).

Figures 8, 9:
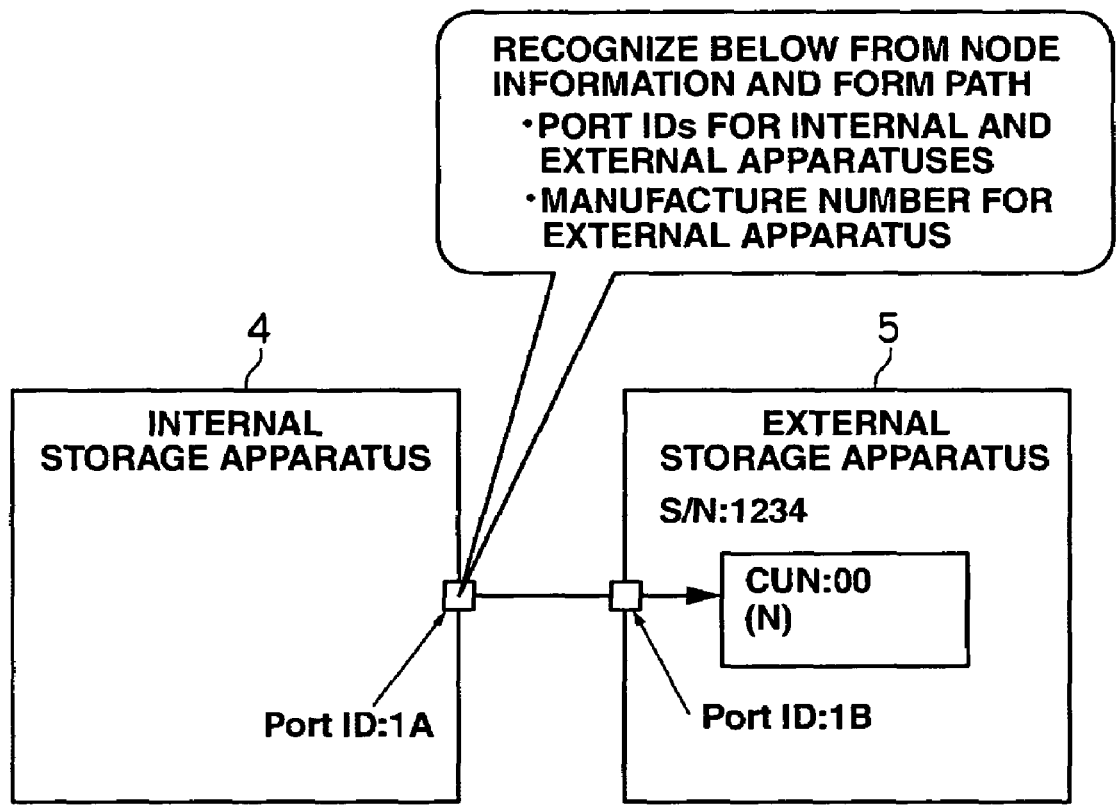
FIG. 8 is a conceptual diagram provided to explain path setting processing.
FIG. 9 is a conceptual diagram provided to explain path setting processing.

Subsequently, the CPU 21A, as shown in FIG. 8, executes link-initialization processing for an "Initiator" port (a port that issues directions) in the channel interface 20A (FIG. 1) connected to the external storage apparatus 5, and as shown in FIG. 9, recognizes the port ID for the internal storage apparatus 4 ("1A" in the example of FIG. 9), the port ID for the external storage apparatus 5 ("1B" in the example of FIG. 9), and the manufacture number for the external storage apparatus 5 ("12345" in the example of FIG. 9) (SP2).

Then, the CPU 21A provides the external storage apparatus 5 with the same control unit number as the one recognized at step SP1 based on the port ID for its own storage apparatus (the internal storage apparatus 4), the port ID for the external storage apparatus 5, and the manufacture number for the external storage apparatus 5 obtained at step SP2 to establish a logical path to the external storage apparatus 5 (SP3).

Figures 10, 11:
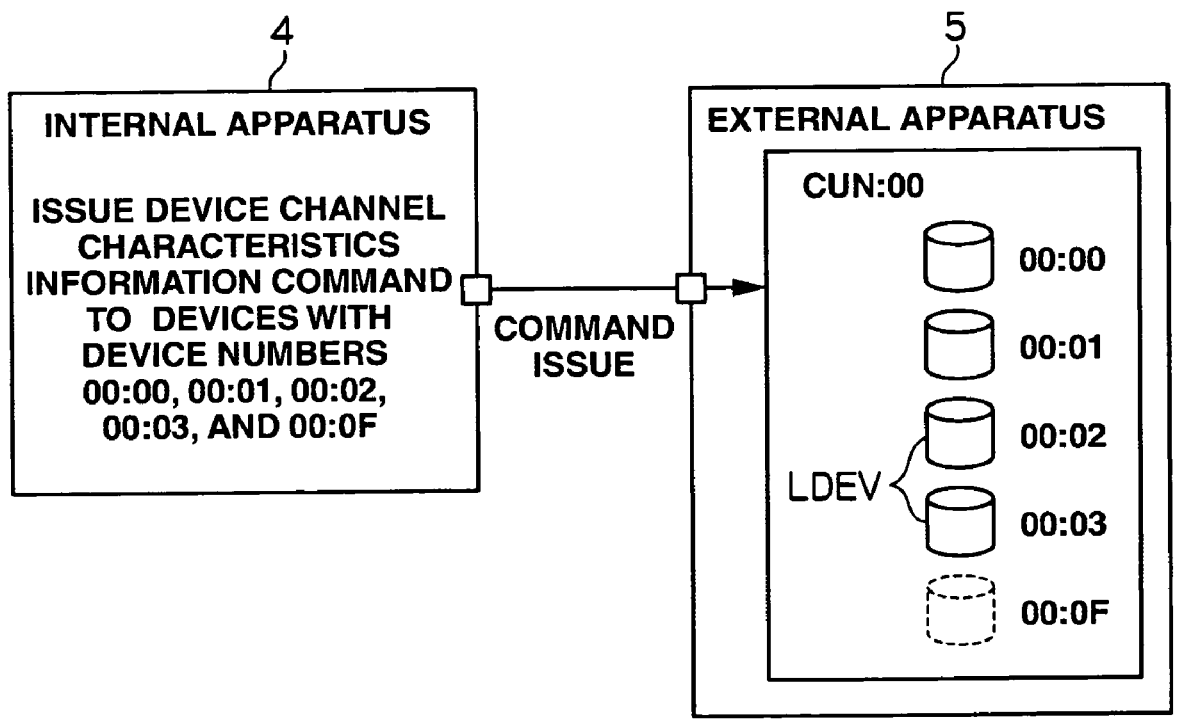
FIG. 10 is a conceptual diagram provided to explain path setting processing.
FIG. 11 is a conceptual diagram provided to explain path setting processing.

Next, the CPU 21A, as shown in FIG. 10, selects all the logical devices LDEV ("00:00" to "00:0F") recognized by the host apparatus 2 at step SP1 as being connected to the channel, recognized by the CPU 21A at step SP1 (SP4), and as shown in FIG. 11, sends a "Device Characteristics Information" command to the selected logical devices LDEV via the logical path established at step SP3 (SP5).

Each of the logical devices LDEV in the external storage apparatus 5 (the logical devices LDEV that are the destinations for the "Device Characteristics Information" command), upon receipt of the "Device Characteristics Information" command, stores information relevant to its own device in the respective fields 40A to 40D, . . . in the "Device Characteristics Information" command, and then returns that command to the internal storage apparatus 4 via the logical path established at step SP3.

When no destinations for the "Device Characteristics Information" command, that is, no logical devices LDEV recognized by the host apparatus 2 as being connected to the channel, exist in the external storage apparatus 5, the external storage apparatus 5 sends a "Device Level Exception" notice, which is a notice informing that no such logical devices LDEV exist, to the external storage apparatus 4 via the logical path established at SP3.

Meanwhile, as shown in FIG. 12, the CPU 21A in the internal storage apparatus 4, based on the "Device Characteristic Information" commands returned from the external storage apparatus 5, judges the logical devices LDEV, from among those selected at step SP4, that returned the "Device Characteristic Information" command as existing in the external storage apparatus 5, and the logical devices LDEV that did not return the "Device Characteristic Information" command as not existing in the external storage apparatus 5. For the logical devices LDEV judged as existing in the external storage apparatus 5, the CPU 21A recognizes the device types for each of these logical devices LDEV based on the "Device Characteristics Information" commands returned from the logical devices LDEV (SP6).

Subsequently, the CPU 21A compares the logical devices LDEV recognized by the host apparatus 2 as being connected to the host apparatus 2, recognized by the CPU 21 at step SP1, and the logical devices LDEV recognized at step SP6 as existing in the external storage apparatus 5 to judge whether all of the logical devices LDEV recognized by the host apparatus 2 as being connected to the channel exist in the external storage apparatus 5 (SP7).

Figures 14, 15:
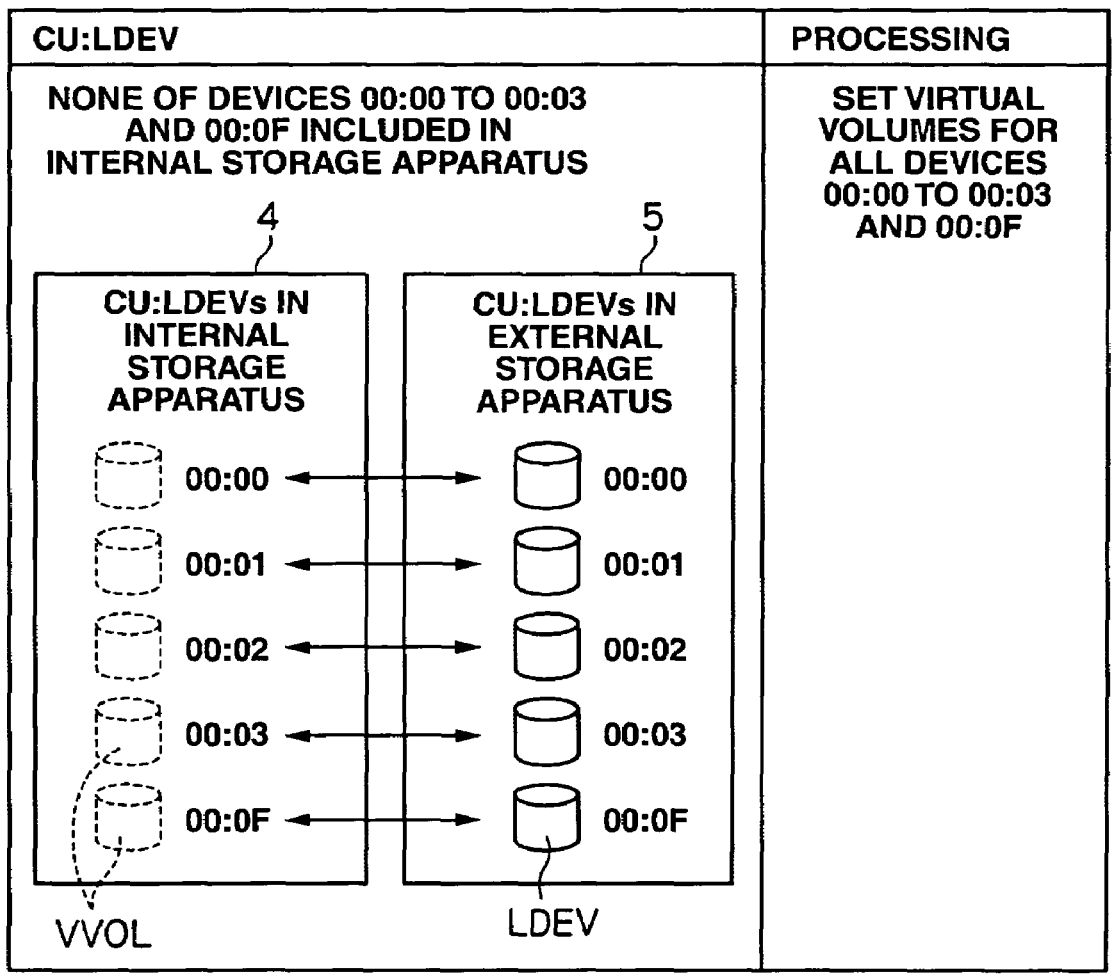
FIG. 14 is a conceptual diagram provided to explain path setting processing.
FIG. 15 is a conceptual diagram provided to explain path setting processing.

Then, as shown in FIG. 13 and FIG. 14, the CPU 21A, if it is judged that all of the logical devices LDEV recognized by the host apparatus 2 as being connected to the channel exist in the external storage apparatus 5, obtains device configuration information, which is information relating to logical devices LDEV existing in its own storage apparatus, stored in the local memory 22A (SP8).

The CPU 21A, based on the obtained device configuration information for its own apparatus, judges whether any logical devices LDEV (including virtual volumes VVOL) with the same device numbers as the logical devices LDEV recognized by the host apparatus 2 as being connected to the channel and existing in the external storage apparatus 5 already exist in the internal apparatus 4 (SP9).

A negative result at that judgment, as shown in FIG. 15, means that no logical devices LDEV (including virtual volumes VVOL) with the same device numbers as the logical devices LDEV recognized by the host apparatus 2 as being connected to the channel and existing in the external storage apparatus 5 exist in the internal apparatus 4.

Therefore, the CPU 21A selects the logical devices LDEV recognized by the host apparatus 2 as being connected to the channel as virtualization objects (SP10), and then sets virtual volumes VVOL having the same device numbers as the selected logical devices LDEV in its own storage apparatus (SP16). Subsequently, the CPU 21A sets a logical path between each of the virtual volumes VVOL set as above, and each of the corresponding logical volumes LDEV in the external storage apparatus 5, and then ends the processing.

Meanwhile, an affirmative result in the judgment at step SP9, as shown in FIG. 16, means that logical devices LDEV (including virtual volumes VVOL) with the same device numbers as the logical devices LDEV recognized by the host apparatus 2 as being connected to the channel and existing in the external storage apparatus 5 exist in the internal apparatus 4.

Therefore, the CPU 21A then makes the maintenance management terminal 26A (FIG. 1) display a warning to the effect that logical devices LDEV with the same device numbers as the logical devices LDEV recognized by the host apparatus 2 as being connected to the channel and existing in the external storage apparatus 5 exist in the internal apparatus 4 (SP14). Then the CPU 21A ends the processing.

Figures 17, 18:
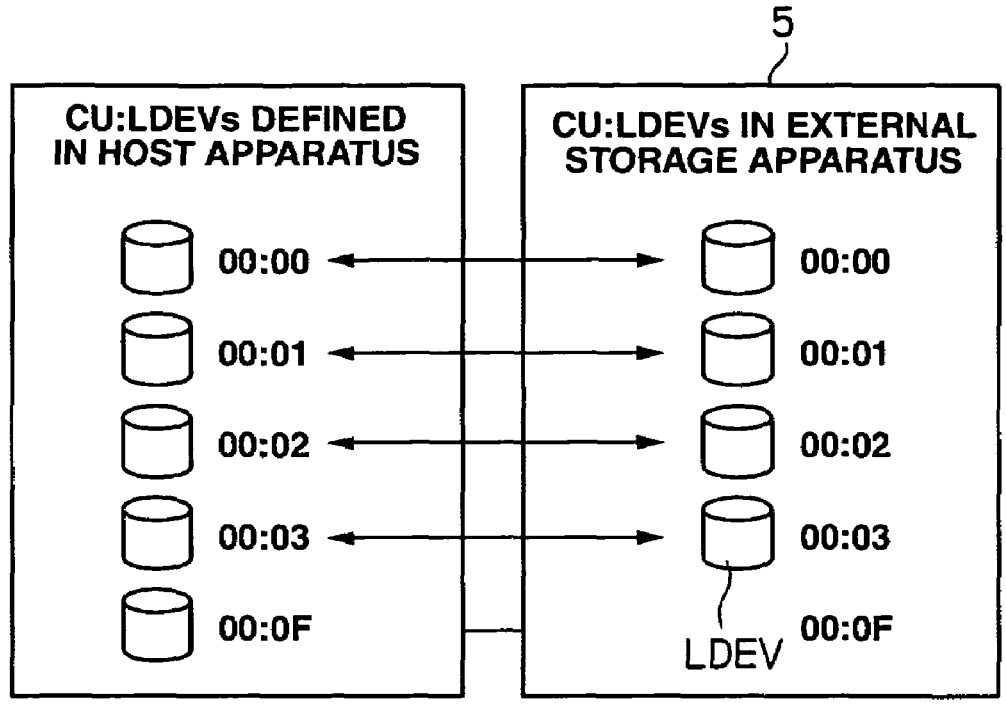
FIG. 17 is a conceptual diagram provided to explain path setting processing.
FIG. 18 is a conceptual diagram provided to explain path setting processing.

When the CPU 21A judges at step SP7 that not all of the logical devices LDEV recognized by the host apparatus 2 as being connected to the channel exist in the external storage apparatus 5 as shown in FIG. 17 and FIG. 18, it recognizes the logical devices recognized by the host apparatus 2 as being connected to the channel and existing in the external storage apparatus 5 (SP11).

The CPU 21A then obtains device configuration information for its own storage apparatus (the internal storage apparatus 4) stored in the local memory 22A like in the above step SP8 (SP12)

The CPU 21A judges whether any logical devices LDEV (including virtual volumes VVOL) with the same device numbers as the logical devices LDEV recognized by the host apparatus 2 as being connected to the channel and existing in the external storage apparatus 5 exist in the internal storage apparatus 4, based on the results of step SP11 and step SP12 (SP13).

Figure 19:
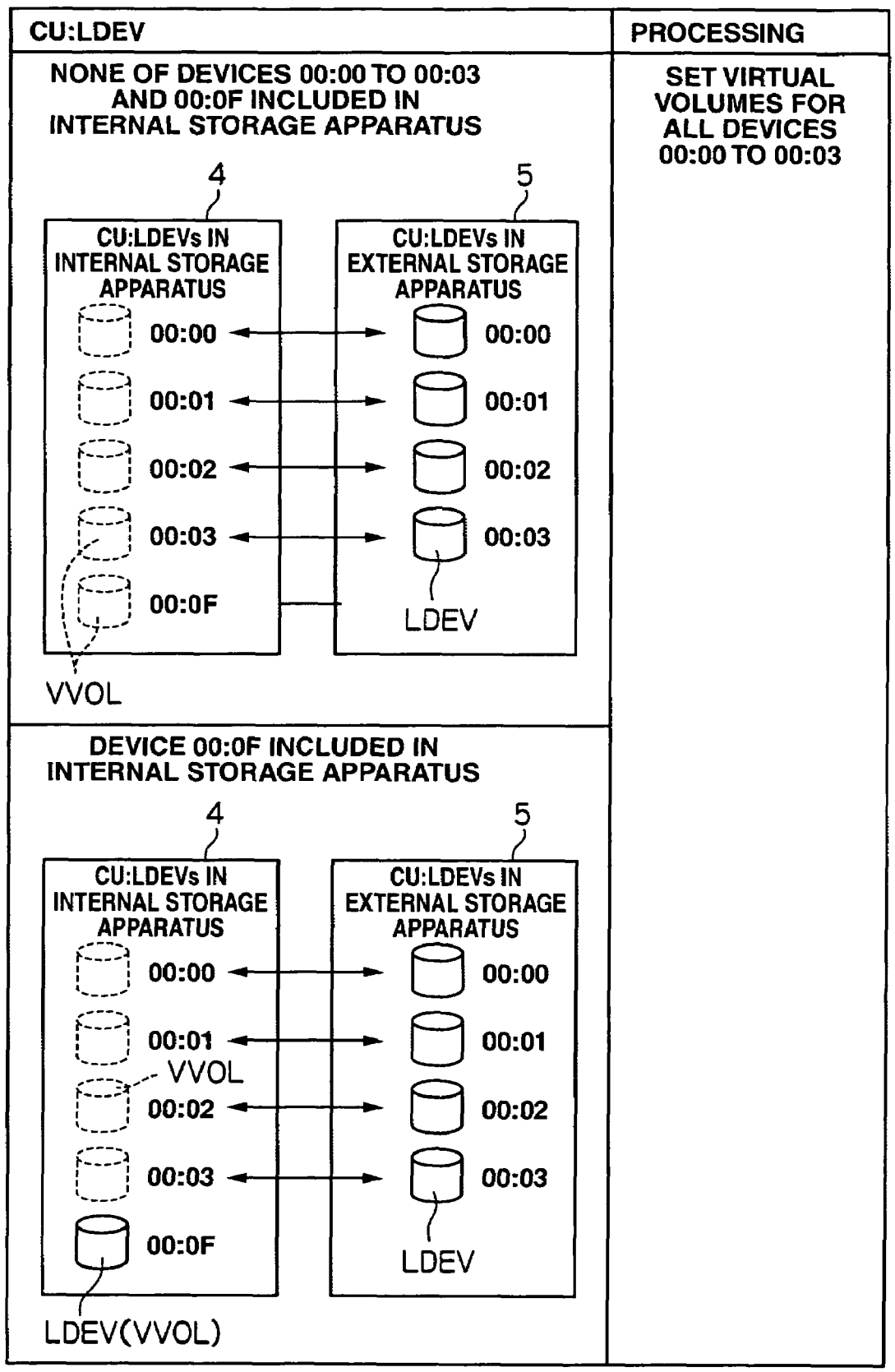
FIG. 19 is a conceptual diagram provided to explain path setting processing.

A negative result at this judgment, as show in FIG. 19, means that no logical devices LDEV with the same device numbers as the logical devices LDEV recognized by the host apparatus 2 as being connected to the channel and existing in the external storage apparatus 5 exist in its own storage apparatus.

Consequently, the CPU 21A selects the logical devices LDEV recognized by the host apparatus 2 as being connected to the channel and existing in the external storage apparatus 5 as virtualization objects (SP15), and sets virtual volumes VVOL each having the same device numbers as each of the selected virtualization object logical devices LDEV in its own storage apparatus (SP16). Then, the CPU 21A sets a logical path between each of the virtual volumes set as above, and each of the corresponding logical devices LDEV, and then ends the processing.

Figure 20:
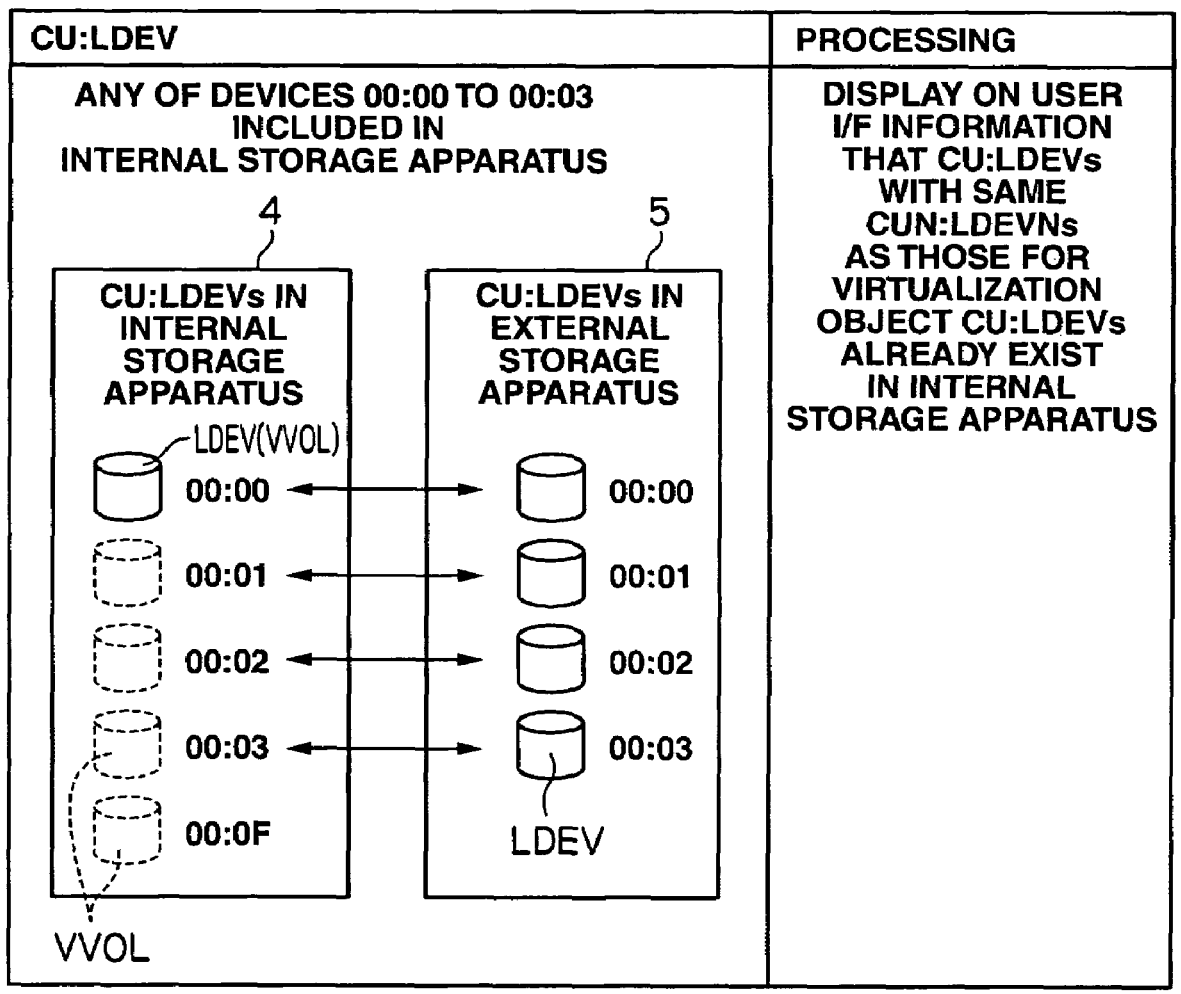
FIG. 20 is a conceptual diagram provided to explain path setting processing.

Meanwhile, an affirmative result in the judgment at step SP13, as shown in FIG. 20, means that logical device(s) LDEV (including virtual volumes VVOL) with the same device numbers as logical devices LDEV recognized by the host apparatus 2 as being connected to the channel and existing in the external storage apparatus 5 already exist in the internal storage apparatus 4.

Therefore, the CPU 21A then makes the maintenance management terminal 26A (FIG. 1) display a warning to the effect that logical devices LDEV with the same device numbers as logical devices LDEV recognized by the host apparatus 2 as being connected to the channel and existing in the external storage apparatus 5 already exist in the internal storage apparatus 4 (SP14). Then the CPU 21A ends the processing.

(2-3) Effect of the Embodiment

In the above-described configuration, the CPU 21A in the internal storage apparatus 4 recognizes the logical devices LDEV recognized by a host apparatus 2 as being connected to a channel connected to the internal storage apparatus 4, and also ones, from among those logical devices LDEV, that exist in its own storage apparatus, based on "Device Characteristics Information" commands sent from the host apparatus 2 when the channel is brought on-line.

The CPU 21A also recognizes the relevant logical devices LDEV that exist in the external storage apparatus 5, based on the responses to the "Device Characteristics Information" commands obtained by sending the "Device Characteristics Information" commands to the external storage apparatus 5. The CPU 21A then sets virtual volume VVOL in its own storage apparatus based on the recognition results, and also sets a logical path between each of these virtual volumes VVOL and each of the corresponding logical volumes in the external storage apparatus 5.

Accordingly, in the storage system 1, the setting of virtual volumes in the internal storage apparatus 4, and the setting of a logical path between each of the virtual volumes and each of the corresponding logical devices in the external storage apparatus 5 are performed without human labor, making it possible to omit system administrator workload for these settings, and also to prevent the occurrence of data destruction caused by an error in the settings. Consequently, it is possible to obtain a highly-reliable storage system that is less burdensome settings-wise.

(2) Second Embodiment

Virtual volumes having the same device numbers as logical devices existing in the external storage apparatus 5 cannot be set in the internal storage apparatus 4 when an affirmative result has been obtained in the judgment at step SP9 in the path setting procedure RT1, or when a negative result has been obtained in the judgment at step SP13 in FIG. 4 and FIG. 5. Therefore, in this case, virtual volumes VVOL will be set in the internal storage apparatus 4 with device numbers different from those for the logical devices LDEV (including virtual volumes VVOL) already existing in the internal storage apparatus provided.

However, in that case, it is necessary to update generation information in the host apparatus 2 according to the device numbers assigned to the set virtual volumes VVOL, which may cause trouble with input errors in the update.

Therefore, in a storage system 50 (FIG. 1) according to a second embodiment of the present invention, as shown in FIG. 21A, it is possible to separately manage logical devices LDEV (including virtual volumes VVOL) having the same device number by adding an ID (hereinafter referred to as "device number ID") to each of the logical devices LDEV (including virtual volumes VVOL) in the internal storage apparatus 4.

Figure 22:
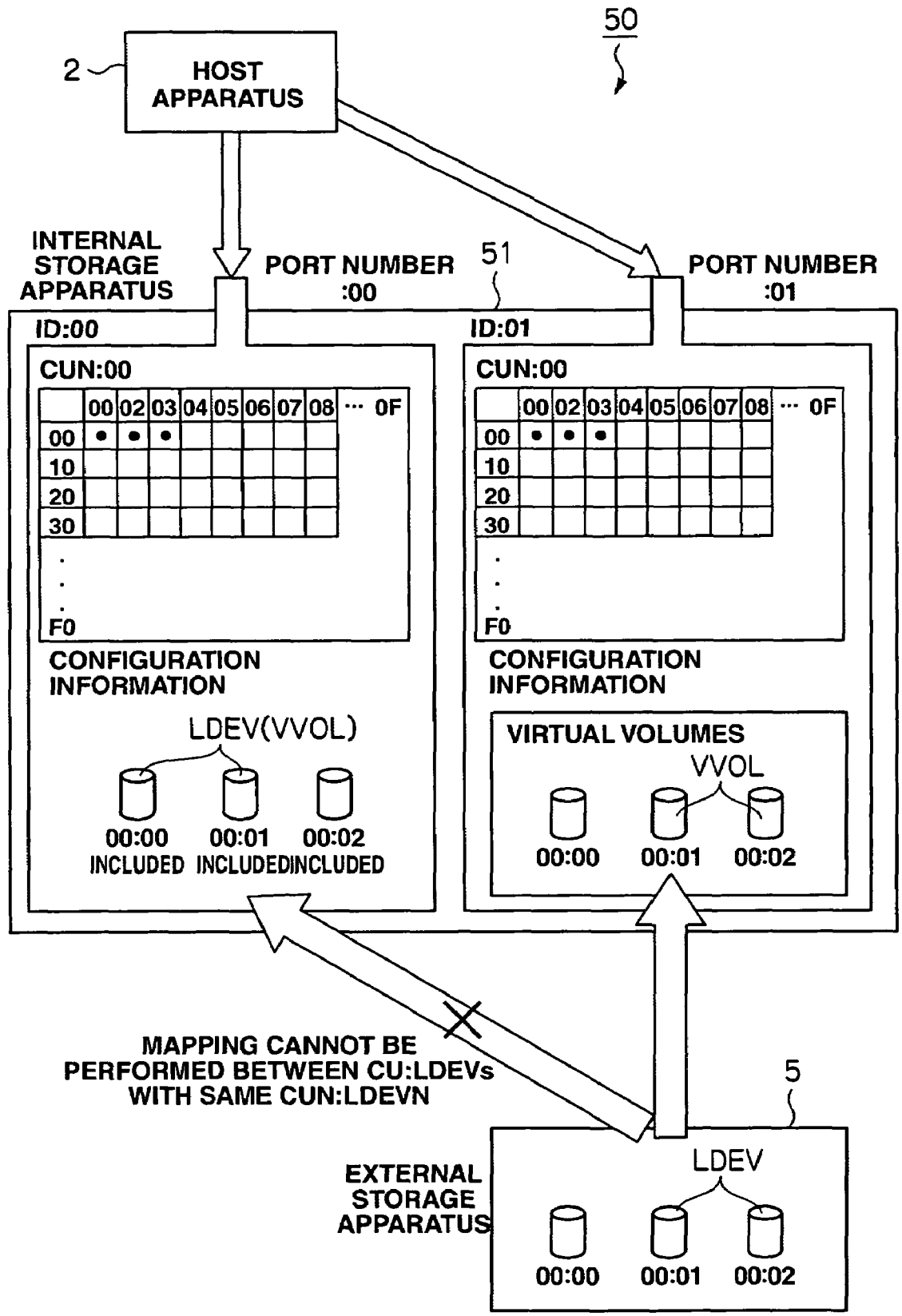
FIG. 22 is a conceptual diagram provided to explain error processing during path setting processing according to the second embodiment.
Figure 23:
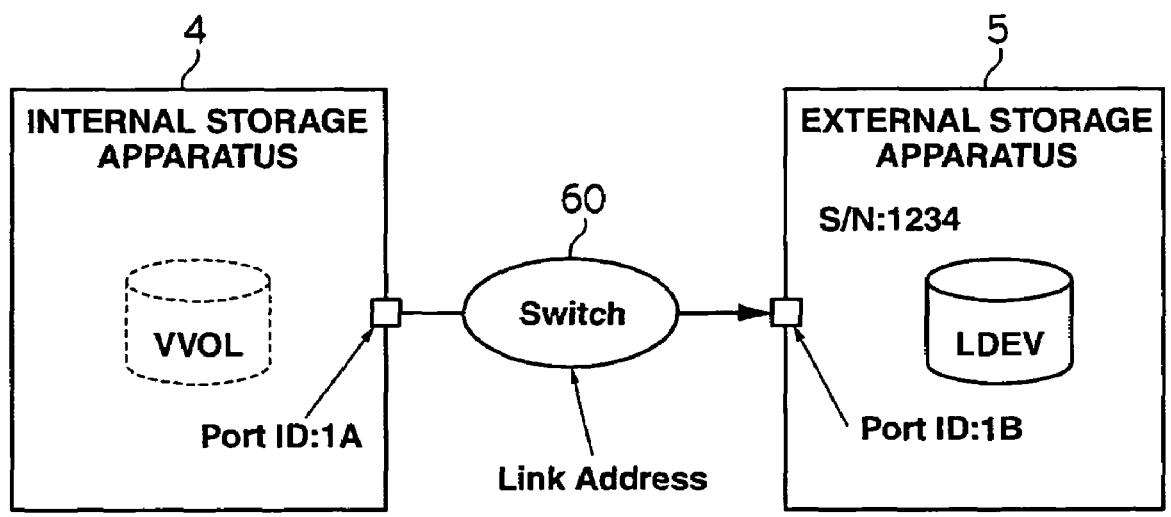
FIG. 23 is a conceptual diagram provided to explain another embodiment of the present invention.

In this case, as shown in FIG. 21B, the device IDs are managed on a port basis. In other words, as shown in FIG. 22, only access from the relevant port, which differs from device number ID to device number ID, is allowed. This is for preventing confusion in the management of logical devices LDEV having the same device number by separating those logical devices according to their respective accessible ports, because already-defined logical devices LDEV having the same device number may be used by another host apparatus 2.

The CPU 21A in the internal storage apparatus 51 (FIG. 1) according to the second embodiment, when an affirmative result has been obtained at step SP9 in the path setting procedure RT1, or when a negative result has been obtained at step SP13 in FIG. 4 and FIG. 5, that is, when any logical device LDEV (including a virtual volume VVOL) having the same device number as a logical device in the external storage apparatus 5 is already set in the internal storage apparatus 4, switches the port for the logical path then connected to the host apparatus 2 to another port (in the example of FIG. 21(B), the port with the port number "00" is switched to the port with the port number "01".)

The CPU 21A also creates a virtual volume VVOL corresponding to a logical volume LDEV in the external storage apparatus 5, providing the virtual volume with a device number ID "01", and as shown in FIG. 21C, the logical device LDEV is mapped onto the virtual volume VVOL. Furthermore, the CPU 21A displays a warning to the effect that that switching of ports has been performed at step SP14 in the path setting procedure RT1.

Consequently, the user sets the host apparatus 2 to, when accessing a logical device LDEV already set in the internal storage apparatus 4, access the port with the port ID "00" in the internal storage apparatus 4, and when accessing a logical device LDEV set in the external storage apparatus 5 using the same device number as the logical device LDEV in the internal storage apparatus 4, access the port with the port ID "01"

in the internal storage apparatus 4, ensuring that the host apparatus 2 can access the desired one from the logical device LDEV with the device number ID "00" and the logical device LDEV with the same device number and the device number ID "01".

As described above, in the storage system 50 according to the second embodiment, a logical device LDEV in the internal storage apparatus 4 is managed with a device number ID added to its device number, and a different port is set for each device number ID, making device number ID-based access to a virtual volume VVOL possible, and therefore, even when the device number for a logical device LDEV recognized by the host apparatus 2 as being connected to the channel and existing in the external storage apparatus 5 is identical to the device number for a logical device LDEV already existing in the internal storage apparatus 4 in the path setting processing described with reference to FIG. 4 and FIG. 5, these logical devices LDEV can be managed separately.

(3) Other Embodiments

The above-described embodiments relate to the case where the internal storage apparatus 4 and the external storage apparatus 5 are directly connected to each other. However, the present invention is not limited to these embodiments, and can apply to the case where the internal storage apparatus 4 and the external storage apparatus 5 are connected via a switch 60. However, in this case, it is necessary to set a link address in the switch 60 to set a logical path between each of the virtual volumes VVOL in the internal storage apparatus 4 and the corresponding logical devices LDEV in the external storage apparatus 5.

The above-described embodiments relate to the case where a CPU 21A includes: a logical device recognition unit that recognizes one or more logical devices LDEV defined in a host apparatus 2 as being connected to a channel; a logical device detection unit that detects one or more logical devices LDEV existing in the external storage apparatus 5 from among the one or more logical devices LDEV defined in the host apparatus 2 as being connected to the channel; and a logical path setting unit that sets, based on the detection result, one or more virtual volumes VVOL in its own storage apparatus 4, respectively corresponding to the one or more logical devices existing in the external storage apparatus 5 from among the one or more logical devices LDEV defined in the host apparatus 2 as being connected to the channel, and sets a logical path between each of the set one or more virtual volumes VVOL and each of the corresponding one or more logical devices existing in the external storage apparatus 5. However, the present invention is not limited to these embodiments, and the logical device recognition unit, the logical device detection unit, and the logical path setting unit may be provided separately.

The present invention can be applied to a wide range of storage apparatuses with external connectability, and storage systems that include that storage apparatus as a component.

What is claimed is:

1. A storage system comprising a first storage apparatus and a second storage apparatus, the first storage apparatus being provided between a host apparatus and the second storage apparatus that is external to the host apparatus and the first storage apparatus and that provides one or more logical devices for storing data, the one or more logical devices provided by the second storage apparatus being virtualized as virtual volumes by the first storage apparatus as if internal logical devices thereof to the host apparatus, wherein upon a channel connected to the first storage apparatus coming on-line, the host apparatus sends via the channel a predetermined inquiry command to all logical devices defined as being connected to the channel; and the first storage apparatus:

recognizes logical devices defined in the host apparatus as being connected to the channel, based on the inquiry command sent from the host apparatus, detects one or more logical devices among the logical devices defined in the host apparatus as being connected to the channel and located in the second storage apparatus, based on the recognized logical devices recognition result, sets, based on the detected one or more logical devices detection result, one or more virtual volumes in the first storage apparatus, respectively corresponding to the detected one or more logical devices which are connected to the channel and located in the second storage apparatus, and sets a first logical path between each of the set one or more virtual volumes and each of the corresponding one or more logical devices located in the second storage apparatus, executes link-initialization processing for a port in the first storage apparatus to be connected to the second storage apparatus, recognizes a port ID of the port of the first storage apparatus, a port ID of a corresponding port of the second storage apparatus and a manufacture number for the second storage apparatus, provides the second storage apparatus with a type of the host apparatus based on the port ID of the port of the first storage apparatus, the port ID of the port of the second storage apparatus, and the manufacture number of the second storage apparatus to establish the first logical path to the second storage apparatus, selects all the logical devices recognized by the first storage apparatus as being connected to the channel, sends the inquiry command to the selected logical devices via the first logical path, compares the logical devices recognized by the first storage apparatus as being connected to the channel with the logical devices detected as existing in the second storage apparatus to judge whether all of the logical devices recognized by the first storage apparatus as being connected to the channel exist in the second storage apparatus, if it is judged that not all of the logical devices recognized by the first storage apparatus as being connected to the channel exist in the second storage apparatus, recognizes the logical devices recognized by the first storage apparatus as being connected to the channel and existing in the second storage apparatus, obtains device configuration information for the first storage apparatus, judges whether any logical devices existing in the first storage apparatus, which include virtual volumes, have identical device numbers as the logical devices recognized by the first storage apparatus as being connected to the channel and existing in the second storage apparatus, and selects the logical devices recognized by the first storage as being connected to the channel and existing in the second storage apparatus as virtualization objects, and sets virtual volumes each having the identical device numbers as each of selected virtualization object logical devices in the first storage apparatus, and sets the first logical path between each of the set virtual volumes and each of the virtualization object logical devices, wherein the inquiry command is a command to seek device configuration information of said all logical devices defined as being connected to the channel for respectively storing therein: control unit type information indicating a type of the host apparatus that can access the detected one or more logical devices, control unit model information indicating a model of a control unit, device type information indicating a type of the detected one or more logical devices, and device model information indicating a model of the detected one or more logical devices, and the device IDs are managed on a port basis to allow only access to a device from a relevant port so as to separate the logical devices with the identical device numbers according to the respective accessible ports.

2. The storage system according to claim 1, wherein the first storage apparatus sends the inquiry command to each of the detected one or more logical devices defined in the host apparatus as being connected to the channel and located in the second storage apparatus, and detects one or more logical devices, from among the one or more logical devices located in the second storage apparatus, based on each response from the one or more logical devices to the inquiry command.

3. The storage system according to claim 2, wherein the first storage apparatus sets a second logical path between the first storage apparatus and the second storage apparatus, based on node information for the second storage apparatus obtained upon initialization of a physical path connected to the second storage apparatus, and sends the inquiry command to each of the detected one or more logical devices defined in the host apparatus as being connected to the channel and located in the second storage apparatus via the second logical path.

4. The storage system according to claim 1, wherein the first storage apparatus manages an address number that is provided for each of the one or more virtual volumes, and is identical to an address number for a corresponding one of the one or more logical devices in the second storage apparatus, with identification information added to the address number, and sets a different port for each piece of identification information added to the address number, as a port accessible to a virtual volume among the one or more virtual volumes.

5. The storage system according to claim 1, wherein the first and second apparatuses directly communicate via a line and respectively internal channel interfaces thereof.

6. The storage system according to claim 1, wherein the first and second apparatuses directly communicate via a switch.

7. The storage system according to claim 1, wherein the first storage apparatus compares device numbers of internal logical devices with device numbers of the logical devices of the second storage apparatus to be virtualized as virtual volumes by the first storage apparatus, and display a warning if there is any duplicated device number.

8. The storage system according to claim 7, wherein if there is any duplicated device number, an additional level of identification is added to the internal logical devices of the first storage apparatus and the virtual volumes.

9. The storage system according to claim 8, wherein the additional level of identification is added as port numbers.

10. A logical device virtualization method for a storage system comprising a first storage apparatus and a second storage apparatus, the first storage apparatus is provided between a host apparatus and the second storage apparatus that is external to the host apparatus and the first storage apparatus and that provides one or more logical devices for storing data, the one or more logical devices provided by the second storage apparatus being virtualized as virtual volumes by the first storage apparatus as if internal logical devices thereof to the host apparatus, the method comprising:

upon a channel connected to the first storage apparatus coming on-line, the host apparatus sending via the channel a predetermined inquiry command to all logical devices defined as being connected to the channel, the first storage apparatus recognizing the logical devices defined in the host apparatus as being connected to the channel, based on the inquiry command sent from the host apparatus, the first storage apparatus detecting one or more logical devices among the logical devices defined in the host apparatus as being connected to the channel and located in the second storage apparatus, based on the recognized logical devices, the first storage apparatus setting, based on the detected one or more logical devices, one or more virtual volumes in the first storage apparatus, respectively corresponding to the detected one or more logical devices which are connected to the channel and located in the second storage apparatus, and setting a first logical path between each of the set one or more virtual volumes and each of the corresponding one or more logical devices located in the second storage apparatus, the first storage apparatus executing link-initialization processing for an port in the first storage apparatus to be connected to the second storage apparatus, recognizing a port ID of the port of the first storage apparatus, a port ID of a corresponding port of the second storage apparatus and a manufacture number for the second storage apparatus, the first storage apparatus providing the second storage apparatus with a type of the host apparatus based on the port ID of the port of the first storage apparatus, the port ID of the port of the second storage apparatus, and the manufacture number of the second storage apparatus to establish the first logical path to the second storage apparatus, the first storage apparatus selecting all the logical devices recognized by the first storage apparatus as being connected to the channel, sending the inquiry command to the selected logical devices via the first logical path, the first storage apparatus comparing the logical devices recognized by the first storage apparatus as being connected to the channel with the logical devices detected as existing in the second storage apparatus to judge whether all of the logical devices recognized by the first storage apparatus as being connected to the channel exist in the second storage apparatus, if it is judged that not all of the logical devices recognized by the first storage apparatus as being connected to the channel exist in the second storage apparatus, the first storage apparatus recognizing the logical devices recognized by the first storage apparatus as being connected to the channel and existing in the second storage apparatus, the first storage apparatus obtaining device configuration information for the first storage apparatus, the first storage apparatus judging whether any logical devices existing in the first storage apparatus, which include virtual volumes, have identical device numbers as the logical devices recognized by the first storage apparatus as being connected to the channel and existing in the second storage apparatus, and the first storage apparatus selecting the logical devices recognized by the first storage apparatus as being connected to the channel and existing in the second storage apparatus as virtualization objects, and setting virtual volumes each having the identical device numbers as each of selected virtualization object logical devices in the first storage apparatus, and sets the first logical path between each of the set virtual volumes and each of the virtualization object logical devices, wherein the inquiry command is a command to seek device configuration information of said all logical devices defined as being connected to the channel for respectively storing therein: control unit type information indicating a type of the host apparatus that can access the detected one or more logical devices, control unit model information indicating a model of a control unit, device type information indicating a type of the detected one or more logical devices, and device model information indicating a model of the detected one or more logical devices, and the device IDs are managed on a port basis to allow only access to a device from a relevant port so as to separate the logical devices with the identical device numbers according to the respective accessible ports.

11. The virtualization method according to claim 10, wherein the third step includes:

the first storage apparatus sending the inquiry command to each of the detected one or more logical devices defined in the host apparatus as being connected to the channel and located in second storage apparatus; and the first storage apparatus detecting one or more logical devices, from among the one or more logical devices located in the second storage apparatus, based on each response from the one or more logical devices to the inquiry command.

12. The virtualization method according to claim 11, wherein the third step includes:

the first storage apparatus setting a second logical path between the first storage apparatus and the second storage apparatus, based on node information for the second storage apparatus obtained upon initialization of a physical path connected to the second storage apparatus; and the first storage apparatus sending the inquiry command to each of the detected one or more logical devices defined in the host apparatus as being connected to the channel and located in the second storage apparatus via the second logical path.

13. The virtualization method according to claim 10, wherein the fourth step includes:

the first storage apparatus managing an address number that is provided for each of the one or more virtual volumes, and is identical to an address number for a corresponding one of the one or more logical devices in the second storage apparatus, with identification information added to the address number; and the first storage apparatus setting a different port for each piece of identification information added to the address number, as a port accessible to a virtual volume among the one or more virtual volumes.

14. A storage apparatus provided between a host apparatus and another storage apparatus that is external to the host apparatus and the storage apparatus and provides one or more logical devices for storing data, the storage apparatus virtualizing the one or more logical devices provided by said another storage apparatus as virtual volumes as if internal logical devices thereof to the host apparatus, the storage apparatus comprising:

a logical device recognition unit that, when the host apparatus sends via a channel a predetermined inquiry command to all logical devices defined as being connected to the channel upon the channel connected to the storage apparatus coming on-line, recognizes the one or more logical devices defined in the host apparatus as being connected to the channel, based on the inquiry command sent from the host apparatus;

a device detection unit that detects one or more logical devices among the logical devices defined in the host apparatus as being connected to the channel and located in said another storage apparatus, based on the recognized logical devices;

a logical path setting unit that sets, based on the detected one or more logical devices, one or more virtual volumes in the storage apparatus, respectively corresponding to the detected one or more logical devices which are connected to the channel and located in said another storage apparatus, and sets a first logical path between each of the set one or more virtual volumes and each of the corresponding one or more logical devices located in said another storage apparatus;

a unit that executes link-initialization processing for an port in the storage apparatus to be connected to said another storage apparatus, recognizes a port ID of the port of the storage apparatus, a port ID of a corresponding port of said another storage apparatus and a manufacture number for said another storage apparatus;

a unit that provides said another storage apparatus with a type of the host apparatus based on the port ID of the port of the storage apparatus, the port ID of the port of said another storage apparatus, and the manufacture number of said another storage apparatus to establish the first logical path to the second storage apparatus;

a unit that selects all the logical devices recognized by the logical device recognition unit as being connected to the channel, sends the inquiry command to the selected logical devices via the first logical path;

a unit that compares the logical devices recognized by the logical device as being connected to the channel with the logical devices detected as existing in said another storage apparatus to judge whether all of the logical devices recognized by the logical device recognition unit as being connected to the channel exist in said another storage apparatus;

if it is judged that not all of the logical devices recognized by the logical device recognition unit as being connected to the channel exist in said another storage apparatus, a unit that recognizes the logical devices recognized by the logical device recognition unit as being connected to the channel and existing in said another storage apparatus;

a unit that obtains device configuration information for the storage apparatus;

a unit that judges whether any logical devices existing in the storage apparatus, which include virtual volumes, have identical device numbers as the logical devices recognized by the logical device recognition unit as being connected to the channel and existing in said another storage apparatus; and a unit that selects the logical devices recognized by the logical device recognition unit as being connected to the channel and existing in said another storage apparatus as virtualization objects, and sets virtual volumes each having the identical device numbers as each of selected virtualization object logical devices in the storage apparatus, and sets the first logical path between each of the set virtual volumes and each of the virtualization object logical devices, wherein the inquiry command is a command to seek device configuration information of said all logical devices defined as being connected to the channel for respectively storing therein: control unit type information indicating a type of the host apparatus that can access the detected one or more logical devices, control unit model information indicating a model of a control unit, device type information indicating a type of the detected one or more logical devices, and device model information indicating a model of the detected one or more logical devices, and the device IDs are managed on a port basis to allow only access to a device from a relevant port so as to separate the logical devices with the identical device numbers according to the respective accessible ports.

* * * * *